United States Patent [19]

McGee et al.

[11] 4,210,372
[45] Jul. 1, 1980

[54] RETAINER FOR BEARING LOCK NUT

[75] Inventors: Mary Ann C. McGee, Chillicothe; William A. Bahnfleth, East Peoria, both of Ill.

[73] Assignee: Caterpillar Tractor Co., Peoria, Ill.

[21] Appl. No.: 916,975

[22] Filed: Jun. 19, 1978

Related U.S. Application Data

[63] Continuation-in-part of Ser. No. 767,856, Feb. 11, 1977, abandoned.

[51] Int. Cl.² .................... F16C 33/30; F16B 39/00
[52] U.S. Cl. ............................. 308/189 R; 151/29; 180/9.62; 308/178; 308/207 R; 308/236; 403/320; 403/359
[58] Field of Search ................. 308/24, 178, 189 R, 308/189 A, 197, 207 R, 207 A, 236; 151/27, 28, 29; 180/9.62; 403/320, 359

[56] References Cited

U.S. PATENT DOCUMENTS

| 906,476 | 12/1908 | Ullmann | 151/29 |
| 1,934,439 | 11/1933 | Messmer | 151/29 |
| 3,323,844 | 6/1967 | Hedstrom | 308/189 R |
| 3,622,185 | 11/1971 | Rosan et al. | 151/28 |

Primary Examiner—Charles E. Frankfort
Attorney, Agent, or Firm—Wegner, Stellman, McCord, Wiles & Wood

[57] ABSTRACT

A retainer for preventing relative rotation of a lock nut threaded on a shaft to preload an adjacent bearing assembly includes a serrated bore for engaging a splined shaft portion extending through a bore and axially-extending projections for engaging notches or the like formed in the lock nut. A device, such as a sprocket wheel, mounted outward of the retainer maintains the retainer in axial engagement with the lock nut. The retainer can be deformed during assembly to facilitate proper alignment of the lock nut on the shaft. The retainer is advantageously employed to maintain preloads on tapered roller bearings utilized to support the final drive shafts in heavy earthmoving equipment.

18 Claims, 6 Drawing Figures

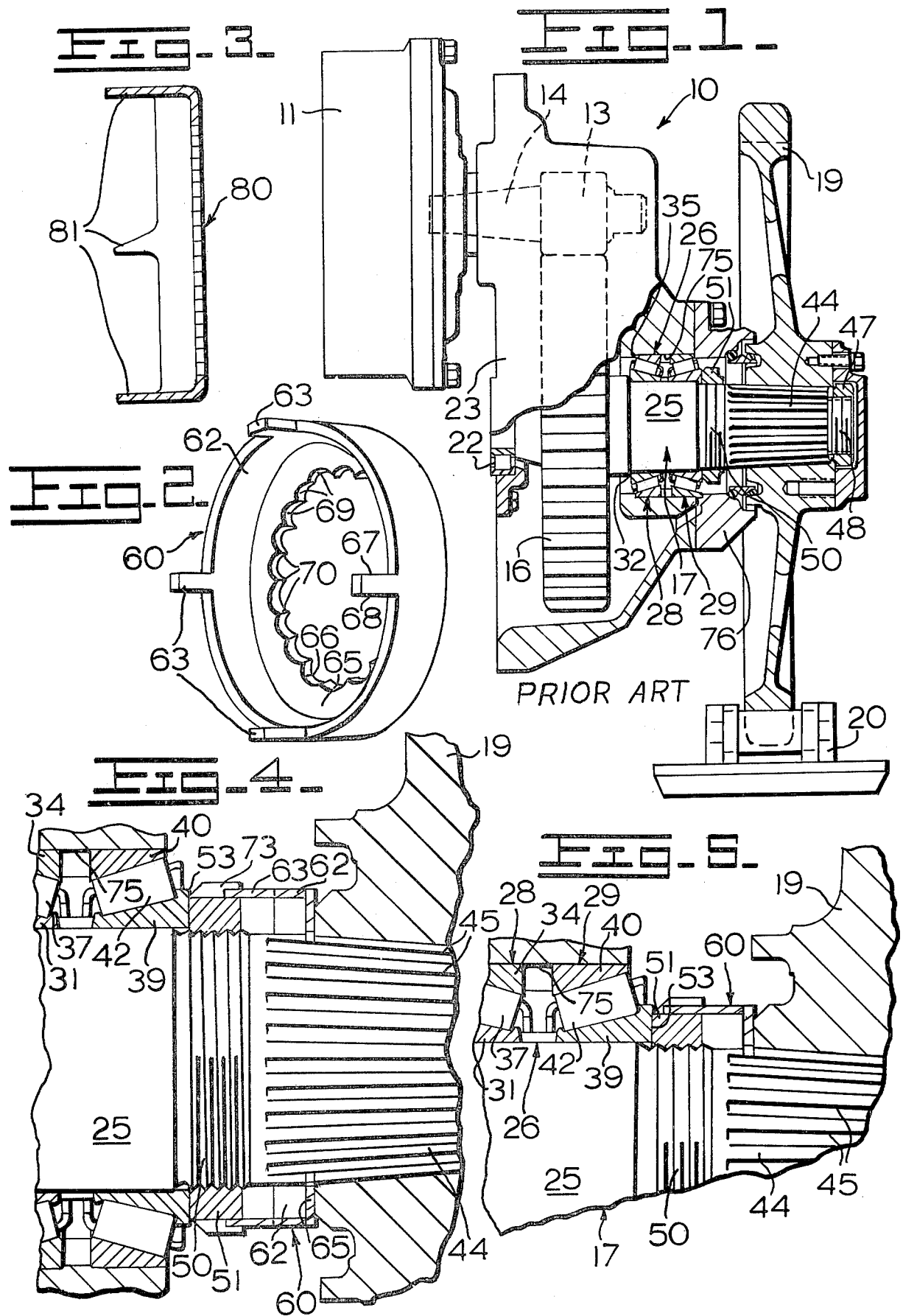

RETAINER FOR BEARING LOCK NUT

CROSS-REFERENCE TO RELATED APPLICATION

This application is a continuation-in-part of our copending application Ser. No. 767,856 filed Feb. 11, 1977, entitled "Retainer for Bearing Lock Nut", now abandoned.

BACKGROUND OF THE INVENTION

This invention relates generally to a means for maintaining preloads on a bearing supporting a rotatable shaft and, more particularly, to a retainer which cooperates with a conventional lock nut maintaining the preload so as to prevent rotation of the lock nut relative to the shaft.

While this invention may be employed in many fields, it is particularly useful in confunction with drive assemblies for heavy-duty earthmoving equipment, such as crawler tractors and the like. The final drive and the traction chains located on each side of the crawler tractor are subjected to substantial radial and axial thrust loads. These loads are the result of the high driving force required for operation and the erratic loading placed on the tractor drive because of rough terrain, side hill operation and directional changes.

In order to provide sufficient friction free support for the highly-loaded rotatable drive shafts, shock resistant, heavy-duty, tapered roller bearings are employed. If properly arranged and preloaded, these tapered roller bearings have inherent capability to efficiently accommodate both radial and axial thrust loads. In order to withstand high stress loads and deflection of components, it is vital that the required preloads on the tapered roller bearings be maintained so as to provide rigidity, positive support and extended service life for the bearings and the associated components.

In the prior art, it is a common practice to plate a lock nut onto the rotating shaft to bear against the bearing in an attempt to maintain prescribed bearing preloads. However, a conventional lock nut has a tendency to work loose during operation so that the bearing preload is diminished. In general, rotation of the lock nut ten degrees will alter the breakaway torque of the lock nut by approximately 100 foot-pounds.

It is possible to make periodic inspections and service adjustments of the bearing and the lock nut. In some applications, ready accessibility makes these inspections and adjustments expedient. Even when the bearings and the lock nuts are not readily accessible, prudent inspections and periodic service should not be ignored. In the case of crawler tractors where the track chains and the drive sprockets must be removed, such periodic inspections are conducted at a great expense. However, if service adjustments to the bearings and the lock nuts are not made, serious damage and total failure of major components can result before operators or service personnel even become aware of the problem.

In order to eliminate the need for periodic servicing, numerous means have been devised to maintain the lock nut in fixed position on the shaft so that the bearing will be subjected to a constant preload force. Lock nuts have been employed which include integral synthetic plastic rings and/or plastic washers for securely gripping the coacting threads on the shaft. However, shaft deflection under high loads may cause this type of lock nut to loosen thereby resulting in partial or complete loss of vital bearing preloads.

A key has been utilized between keyways formed in the lock nut and in the shaft to prevent relative rotation of the lock nut. A threaded split nut has also been utilized. These latter two methods do not readily permit small adjustments in the bearing preload. The use of shims in conjunction with a plate fixed to the shaft also has been employed to provide correct positioning of the bearing, but this method does not facilitate quick accurate assembly of the final drive in a production line environment.

A lockwasher which is fixedly secured to the lock nut is available. The lockwasher has internal serrations to prevent rotation of the lockwasher on the shaft and tangs to engage the specially-designed lock nut. Because of the relatively complex cooperating structures necessary to prevent axial disengagement between the lockwasher and the lock nut and the preset tolerance therein, this design is relatively expensive.

It has been found that it is highly desirable to utilize a retainer which can readily be incorporated into existing production designs so as to eliminate any requirement for new machining or assembly procedures.

SUMMARY OF THE INVENTION

The present invention is directed to overcoming one or more of the problems as set forth above.

According to the present invention, a retainer having a serrated bore is positioned on the bearing-supported shaft outward of the preloading lock nut and has axially-extending projections which engage the lock nut to prevent rotation of the lock nut relative to the retainer. The bore serrations engage splines formed on the shaft to provide an interference fit and prevent relative rotation of the retainer, while means outward of the retainer bears thereagainst to prevent relative axial outward movement of the retainer.

In an exemplary embodiment of the invention, the projections are circumferentially spaced about the retainer and are configured to cooperate with a standard lock nut having complementing axially-extending grooves or notches. As a result, the retainer can be engaged axially after the lock nut has been properly positioned to preload the bearing. The retainer can therefore be easily adapted into existing production methods without designing any new components or assembly procedures. The lock nut may be tightened against the bearing by using a torque wrench operated at a predetermined desirable setting so as to obtain the desired preload.

In a preferred embodiment, the retainer has tapered projections to facilitate alignment and engagement with the lock nut and is fabricated from deformable material capable of accommodating small axial and circumferential alignment adjustments.

BRIEF DESCRIPTION OF THE DRAWINGS

FIG. 1 is an elevational view of a crawler tractor final drive partially in section in which a prior art selflocking retainer nut is employed to axially fix the inner race of a tapered roller bearing on a shaft;

FIG. 2 is a perspective view of a retainer constructed in accordance with the invention which is operative to prevent rotation of a conventional lock nut;

FIG. 3 is a cross-sectional view of an alternative embodiment of a retainer constructed in accordance with the invention;

FIG. 4 is a fragmentary enlarged cross-sectional view of the drive shaft and the tapered roller bearing with the retainer in partial engagement with the lock nut;

FIG. 5 is a fragmentary enlarged cross-sectional view similar to FIG. 4 in which the retainer has been moved into full operative engagement with the lock nut.

DESCRIPTION OF THE PREFERRED EMBODIMENTS

Figure 6:
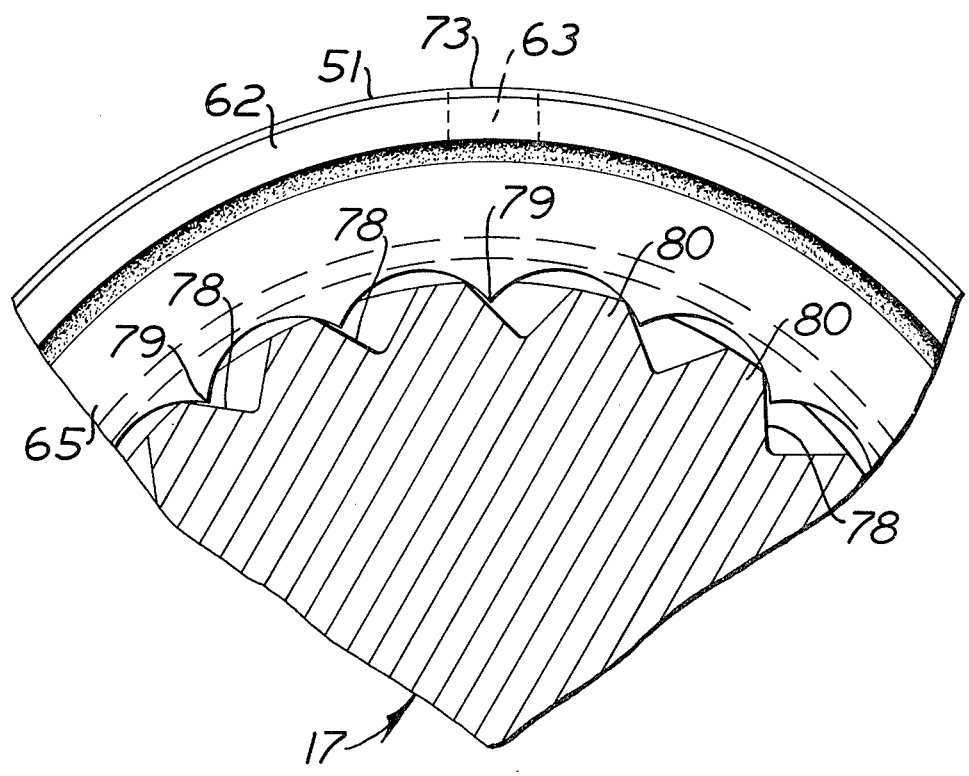
FIG. 6 is a fragmentary enlarged cross-sectional view transverse to the shaft showing the interfering engagement between the retainer and the splines of the drive shaft.

In FIG. 1, a final drive assembly for a crawler tractor, generally designated 10, is seen to broadly include a steering clutch 11, a pinion gear 13 fixed on a shaft 14, a gear 16 which meshes with and is rotated by the pinion gear 13, a sprocket drive shaft, generally designated 17, fixed to the gear 16 and rotated thereby, a sprocket wheel 19 fixed to the drive shaft 17, and a complementing traction chain 20 which is driven continuously by the sprocket wheel 19. The tractor engine (not shown) provides power to the steering clutch 11 for operating the sprocket wheel 19.

The sprocket drive shaft 17 is journaled on one side of the gear 16 by suitable bearings 22 carried by the final drive housing 23. On the opposite side of the gear 16, the drive shaft 17 is seen to have a cylindrical inner portion 25 supported by a tapered roller bearing assembly, generally designated 26, carried by the drive housing 23. The bearing assembly 26 has high radial and axial thrust load capabilities. The bearing assembly 26 includes an inner bearing 28 and an opposed outer bearing 29. The inner bearing 28 has an inner cone race 31 seated against an internal shoulder 32 formed in the drive shaft 17, an outer cup race 34 seated against a shoulder 35 of the drive housing 23, and tapered rollers 36 which are held in operative position between the cone race 31 and the cup race 34. Similarly, the outer bearing 29 has an inner cone race 39, an outer cup race 40, and tapered rollers 42.

The drive shaft 17 has an outer frustoconical portion 44 on which are formed a plurality of axially-extending splines 45. The sprocket wheel 19 has a central bore configured to cooperate with the outer splined portion 44 so that the sprocket wheel 19 is fixed to the drive shaft 17 and rotates therewith. The sprocket wheel 19 is secured against outward axial movement by a lock nut 47 which is tightened onto the threaded outer end 48 of the drive shaft 17.

Between the inner portion 25 and the outer portion 44, the drive shaft 17 has an intermediate portion 50 on which a circumferential thread is formed which cooperatively mounts a lock nut 51. The lock nut 51 is tightened inwardly on the drive shaft 17 so as to bear against the outward end 53 of the cone race 39 to provide the required preload of the bearing assembly 26 so as to obtain positive support for the drive shaft 17.

Referring to FIG. 2, a cup-shaped retainer, generally designated 60, for preventing rotation of the lock nut 51 relative to the drive shaft 17 is seen to include an annular ring portion 62 having a plurality of axially-extending projections 63, and an internal flange portion 65 at one end of the ring portion 62 extending radially inward to define a bore 66. The projections 63 are circumferentially spaced about the ring portion 62, have respective parallel side edges 67 and 68, and are of uniform length. The ring portion 62 and the projections 63 have the same radial thickness. As seen in FIGS. 4 and 5, the retainer 60 is positioned on the drive shaft 17 between the lock nut 51 and the sprocket wheel 19 with the splined outer portion 44 of the drive shaft 17 extending through the bore 66. The bore 66 is serrated or scalloped and is defined by a series of alternating arcuate valleys 69 and ridges or teeth 70. When the retainer 60 is in operative position, the serrations cooperate with the shaft splines 45 to fix the retainer 60 against relative rotation about the drive shaft 17.

In FIG. 1, the final drive assembly 10 as constructed in the prior art has no retainer 60. In FIG. 4, the retainer 60 is shown in partial engagement with the lock nut 51. The lock nut 51 preferably has a polygonal outer circumference in which a plurality of axially-extending grooves or notches 73 have been formed. The notches 73 are spaced about the outer circumference of the lock nut 51 so as to cooperate with the projections 63 of the retainer 60.

As seen in FIG. 1, the outer cup races 34 and 40 are retained within counterbore 75 formed in the drive housing 23 by a cover 76. The lock nut 51 is properly torqued to properly preload the bearing assembly 26. A torque wrench can be utilized to properly position the lock nut 51. The retainer 60 is then implaed on the drive shaft 17 and moved to a position adjacent the lock nut 51. The retainer 60 is of sufficient diameter to allow ready visual alignment and free placement thereof on the drive shaft 17 and permits engagement of the projections 63 in the notches 73 of the lock nut 51 as seen in FIGS. 4 through 6.

The sprocket wheel 19 is subsequently positioned on the outer splined portion 44 of the drive shaft 17 outboard of the retainer 60. The sprocket wheel 19 is easily placed on the drive shaft 17 because of the taper of the outer portion 44 of the drive shaft, but is rigidly attached to the drive shaft 17 by tightening the lock nut 47. In obtaining a tight fit of the sprocket wheel 19 on the drive shaft 17, the sprocket wheel 19 is moved inward against the internal flange portion 65 of the retainer 60. As a result, the retainer 60 is also moved inwardly so that the projections 63 are securely engaged with the notches 73 and the serrations are pressfitted to the splines 45 as seen in FIGS. 5 and 6. The bore 66, which is oversized relative to shaft splines 45, has a diameter such that it slides easily over the outward end of the splined portion 44, but becomes wedged at the wider inward end thereof (FIGS. 4 and 6). The serration teeth 70 provide an interference fit with one or more of the side walls 78 of the shaft splines and are of such size to permit limited deformation of the tooth tips 79 where necessary.

The retainer serrations are not complementary to the shaft splines 45 in the sense of mating threads being complementary. The shaft splines 45 are conventional and, as seen in FIG. 6, the spline teeth 80 have a gear-like configuration. Inasmuch as the spline grooves have a constant depth and are defined by opposed side walls 78 angularly oriented at right angles to one another, the spline grooves are uniform over the length of the tapered outer portion 44.

As seen in FIG. 6, there is a clearance space between the bottom of the serration valleys 69 and the top of the spline teeth 80 and also between the tips 79 and the bottom of the spline grooves. Because of this clearance and because of the noncomplementary configuration of the serrations and the splines, the retainer 60 does not fully mate with the tapered shaft to fill the spline grooves. Thus, the retainer 60 can be readily fitted onto the splined shaft without forced assembly between the lock nut 51 and the retainer 60. Consequently the chance that the splines will be detrimentally scored and their potential service life reduced is decreased.

Since the retainer 60 is made so that the serrations are initially loose fitting, there is no requirement that specific tolerances being maintained. The lock nut is held in place when the serration teeth abut the spline teeth. The serrations and projections are of such size that they effectively maintain the lock nut in position against relative rotation on the threaded shaft even though the serration teeth do not fully mate and fill the spline grooves.

The serration tips do not necessarily have to abut each spline tooth as seen in FIG. 6. If there is slight misalignment or a slight misfit, the narrow tapering tips of the serration teeth may deform, but this takes place without damaging or scoring the spline teeth. Since the serration teeth only partially fit within the grooves between the spline teeth 80, the retainer 60 may be rocked or twisted as it is axially removed to facilitate withdrawal thereof from the shaft 14.

By way of example, assume the shaft 17 has 36 splines with its outer end having a diameter of about 75 mm and its inner end having a diameter of about 86 mm. The grooves have a depth of about 2.5 mm. In contrast, a retainer having 18 serrations has a serrated bore defined by 18 intersecting circular cuts having a diameter of 17.5 mm equally spaced about a circle having a diameter of about 72 mm. Thus, the diametrical spacing between opposed tooth tips is about 84 mm and between valleys is about 90 mm. Thus, the tooth tips will not touch bottom in the spline grooves.

The sprocket wheel 19 thus maintains the retainer 60 in axial engagement with the lock nut 51. Because the retainer 60 is fixed against rotation relative to the drive shaft 17, the lock nut 51 is not permitted to rotate relative to the shaft 17. The lock nut 51 thus remains in its proper fixed axial position with respect to the shaft 17, so as to maintain the required preload on the bearing assembly 26.

The retainer 60 may be integrally fabricated from sheet metal or the like so that the projections 63 and the serrations 69 will deform slightly if some error in alignment or bore sizing exists. It should be evident, however, that the retainer may be formed or fabricated of other material or by other means.

As is evident from inspection of FIG. 5, the retainer 60 is designed so that variations in bearing or sprocket clearance are accommodated since exact tolerance is not required. The retainer 60 has been designed to complement a standard 8-notch lock nut which can be economically obtained.

The number of serrations or scallops, formed about the bore 66 of the retainer 60 as seen in FIG. 6 may be less than the number of splines formed on the outer frustoconical portion 44 of the shaft 17. Normally, the number of splines will be an integral multiple of the number of serrations. For example, there may be three times as many splines as there are serrations. it should be apparent however that a reduction in the number of serrations does not reduce the degree of rotational adjustment achievable when positioning the retainer 60 on the shaft 17, since the number of spaces between the shaft splines engageable by the ridges 70 of the serrations remains the same. By reducing the number of serrations, the size of the valleys 69 and the ridges 70 may be increased. Since the size of the serrations is increased, the useful life of the dies employed to form the retainer will be advantageously extended. In contrast to a retainer having smaller serrations, wear of the dies has relatively little consequence on the effectiveness of a retainer having larger serrations. In addition, the larger serrations enable accurate formation of the serrations even in relatively heavy materials.

In FIG. 3, an alternative embodiment of the retainer is generally designated 80. Herein the projections 81 are tapered to facilitate easy alignment and engagement thereof with the notches 73 of the lock nut 51.

The embodiments of the invention in which an exclusive property or privilege is claimed are defined as follows:

1. A mounting assembly for a shaft including a bearing assembly positioned circumferentially about the shaft for rotatably supporting the shaft within a housing, the shaft having a circumferential thread and axially-extending splines disposed outward of the bearing assembly in one axial direction, a lock nut engaging the shaft thread and being positioned outward of the bearing assembly to bear against the bearing assembly to prevent axial movement thereof in said one axial direction along the shaft, and means for restraining rotation of the lock nut relative to the shaft, said restraining means comprising:

a retainer outward of the lock nut in said one axial direction having a bore through which the shaft extends and having projections extending axially in the opposite axial direction toward the lock nut, said bore having serrations defining teeth non-complementary to the shaft splines in a circumferential direction to cooperate with the shaft splines, said bore being oversized relative to the shaft and said serration teeth being undersized relative to the circumferential width of the grooves between the shaft splines to provide an interference with the splines and hold said retainer against rotation relative to the shaft;

means associated with the lock nut for engaging said projections to fix the lock nut against rotation relative to said retainer; and means outward of the lock nut and said retainer in said one axial direction fixed to the shaft against axial movement for bearing against said retainer to prevent said retainer from axial disengagement with the lock nut, whereby the lock nut is fixed against rotation relative to the shaft so that the lock nut and the bearing assembly remain in preselected axial position.

2. The shaft mounting assembly of claim 1 wherein said engaging means includes axially-extending grooves formed in the circumference of the lock nut, said projections of said retainer being inserted into said grooves to effect engagement therebetween.

3. The shaft mounting assembly of claim 2 wherein said projections have parallel circumferentially-spaced side edges.

4. The shaft mounting assembly of claim 2 wherein said projections are tapered in said opposite axial direction to facilitate alignment and engagement thereof with said grooves of the lock nut.

5. The shaft mounting assembly of claim 1 wherein the shaft has an inner portion interacting with said bearing assembly, an outer frustoconical portion tapering in said one axial direction on which the axially-extending splines are formed, and an intermediate portion on which the thread is formed and the lock nut is positioned, said bore of said retainer having a diameter which is greater than the diameter of the outward end of said frustoconical portion, but less than the diameter at the inward end thereof so that the retainer may be pressfitted onto said frustoconical portion.

6. The shaft mounting assembly of claim 1 wherein said retainer comprises a ring portion, said projections extending axially from one end of said ring portion, and an internal flange portion at the opposite end of said ring portion extending radially inward from said portion to define said bore.

7. The shaft mounting assembly of claim 6 wherein said ring portion is annular and said projections are substantially parallel to the shaft axis and have parallel circumferentially-spaced side edges.

8. The shaft mounting assembly of claim 6 wherein said ring portion and said projections have the same radial thickness.

9. The shaft mounting assembly of claim 8 wherein said ring portion and said projections are integrally made of sheet metal.

10. The shaft mounting assembly of claim 9 wherein said flange portion is integrally formed with said ring portion.

11. The shaft mounting assembly of claim 6 wherein said bearing means is a sprocket positioned on the shaft outward of the retainer to bear against said internal flange portion of said retainer, and further including means for fixing said sprocket in axial position on the shaft.

12. The shaft mounting assembly of claim 1 wherein said retainer is made of sheet metal, the sheet metal being of such strength to accommodate deformation of the serrations during axial and circumferential alignment of said retainer on the shaft.

13. The shaft mounting assembly of claim 1 wherein the number of serrations formed in said retainer bore is less than the number of splines formed on said shaft.

14. The shaft mounting assembly of claim 13 wherein the number of splines formed on said shaft is an integral multiple of the number of serrations formed in said retainer bore.

15. The shaft mounting assembly of claim 14 wherein the number of splines formed on said shaft is three times the number of serrations formed in said retainer bore.

16. In combination with a crawler tractor final drive including a shaft having an inner portion, an outer portion with axially-extending splines and an intermediate portion with a circumferential thread, said splines defining a plurality of spaced, circumferentially extending spaces between said splines, a bearing assembly rotatably supporting the shaft positioned about the inner portion, a lock nut threaded onto the intermediate portion outward of the bearing assembly to retain the bearing assembly in preselected axial position, the lock nut having axially-extending notches radially spaced from the shaft, and a sprocket mounted outward of the lock nut on the outer portion, a retainer positioned on the shaft between the lock nut and the sprocket for preventing rotation of the lock nut relative to the shaft comprising:

a ring portion having axially-extending projections circumferentially spaced about said ring portion, said projections extending inward to engage the notches of the lock nut to prevent rotation of the lock nut relative to said ring portion; and an internal flange portion defining a bore through which the shaft extends, said bore having serrations with teeth cooperating with the shaft splines to fix said retainer against relative rotation about the shaft, said bore and said teeth being of a size that only the tips of the teeth are positioned within the spaces between the shaft splines and only partially fill the spaces in a circumferential direction, said sprocket bearing against said internal flange of said retainer to prevent axial movement of said retainer and maintain said projections in axial engagement with the notches of the lock nut, whereby the lock nut is fixed against relative rotation about the shaft so that the lock nut and the bearing assembly remain in preselected axial position.

17. A retainer for a nut threaded on a shaft adjacent axially extending shaft splines, said splines defining a plurality of spaced, circumferentially extending spaces between said splines, said retainer comprising:

a generally cup-shaped body having an inwardly directed flange and an axially directed ring wall, said flange having a bore bordered by serrations for receiving the splined shaft, said bore having a cross-sectional size greater than the cross-sectional size of the shaft adjacent said nut, said serrations defining circumferentially spaced teeth which only partially fill the spaces between the shaft splines in a circumferential direction when the retainer is placed onto the splined shaft adjacent said nut so that the serration teeth contact the shaft splines, said ring wall having integral spaced projections extending axially of the shaft, and said lock nut having notches in its outer portion for engaging said retainer projections, whereby positioning of the retainer axially of the shaft to engage the serrations with the shaft splines and the projections with the nut notches provides an interference fit holding the nut rotationally relative to the shaft.

18. A retainer for a lock nut threaded on a shaft, the shaft having axially-extending, circumferentially spaced, external splines, said splines defining a plurality of spaced, circumferentially extending spaces between said splines, and a circumferential external thread adjacent the splines in one axial direction for receiving the lock nut, the lock nut having notches radially spaced from the shaft and extending axially of the shaft, and said retainer comprising:

an axially directed ring spaced circumferentially about the shaft;

a plurality of circumferentially spaced projections at one end of said ring extending outward therefrom and axially of the shaft in one direction and being adapted to engage the notches of the lock nut;

an internal flange at the opposite end of said ring directed radially inward to define a serrated shaft receiving bore having a series of serration teeth, said bore and said teeth being of a size such that only the tips of the teeth are positioned within the spaces between the shaft splines and only partially fill the spaces in a circumferential direction, said serration teeth being of a number such that the number of splines is an integral multiple of the number of serration teeth formed about the bore, said flange having a structural strength to permit limited deformation of the tips when the retainer is fitted onto the shaft during assembly, whereby positioning of the retainer axially of the shaft to engage the serrations with the shaft splines and the projections with the lock nut notches provides an interference fit to hold the locknut against rotation relative to the shaft.

* * * * *